United States Patent [19]

Heinzmann et al.

[11] Patent Number: 4,889,429

[45] Date of Patent: Dec. 26, 1989

[54] METHOD AND APPARATUS FOR CONTINUOUS PRODUCTION OF IMPREGNATED COMPOUND

[76] Inventors: Albert Heinzmann, Stegwiessnsrt. 2, 7520 Bruchsal; Gerhard Rottweiller, Brucknerstr. 2, 7507 Pfinztal, both of Fed. Rep. of Germany

[21] Appl. No.: 154,062

[22] Filed: Feb. 9, 1988

[51] Int. Cl.[4] .......................... B01F 7/12; B65B 3/00; B65B 63/02; B29C 43/00

[52] U.S. Cl. ........................................ 366/71; 53/530; 366/73; 366/76; 366/77; 425/367

[58] Field of Search ....................... 366/69, 71, 72, 73, 366/76, 77, 97, 160, 182, 177, 196, 154, 155, 184, 181, 195, 300; 425/130, 406, 420, 202, 308, 102, 201, 209, 367; 264/118, 119, 257, 280, 283, 145, 176.1; 53/529, 513, 249, 530, 436, 438

[56] References Cited

U.S. PATENT DOCUMENTS

| | | | |
|---|---|---|---|
| 2,879,042 | 3/1959 | Jones | 366/181 |
| 3,280,764 | 10/1966 | Potter et al. | 366/195 X |
| 3,340,220 | 9/1967 | Granito et al. | 366/69 |
| 3,558,380 | 1/1971 | Pool | 425/130 X |
| 3,681,485 | 8/1972 | Lieberman | 366/186 X |
| 3,894,134 | 7/1975 | Williams | 264/257 X |
| 3,932,980 | 1/1976 | Mizutani et al. | 53/111 R |
| 4,117,067 | 9/1978 | Charter et al. | 264/128 X |
| 4,474,845 | 10/1984 | Hagerman et al. | 264/280 X |

Primary Examiner—Harvey C. Hornsby
Assistant Examiner—Scott J. Haugland
Attorney, Agent, or Firm—Chilton, Alix & Van Kirk

[57] ABSTRACT

An apparatus and method for continuously making a mixture of viscous material with solid material segments, which utilizes a pair of spaced mixing rolls (26, 28) for dragging the viscous material (42, 44) and the solid material segments (66, 68) into a gap (34) between the mixing rolls to permit the material to be mixed together to form an impregnated compound (82). Each roll has a hopper (36, 38) having an opening (54) and an associated coating blade (46,48) for depositing of layer (42, 44) of desired thickness of the viscous material on the mixing rolls. A solid material cutter (70, 72) is located above and associated with each mixing roller, to provide distinct stream (66, 68) of solid material segments in a uniform rainfall onto the layers of viscous material as the layers emerge from the coating blades. Both the thickness of the viscous layer applied to the rolls and the gap between the rolls are adjustable to accommodate a wide variety of recipes and to produce a variety of useful compounds. A funnel (104) or a compressor unit (86) is associated with the mixing unit (22), for directing the impregnated compound into a receptacle (98, 108). A turntable (102) or a conveyor belt (106) is associated with the compressor or funnel for serially positioning an empty receptacle to receive a predetermined quantity of impregnated compound for shipment to a user of injection molding equipment or the like.

16 Claims, 4 Drawing Sheets

METHOD AND APPARATUS FOR CONTINUOUS PRODUCTION OF IMPREGNATED COMPOUND

BACKGROUND OF THE INVENTION

The present invention relates to the making of a mixture of viscous material with solid material, and more particularly, to an apparatus and method for continuously preparing compounds in which solid fiber reinforcement or the like is impregnated in polyester resins or the like, such compounds being suitable for use in an injection molding process.

Polyester compounds reinforced with glass fibers are increasingly being used for the injection molding of composite materials. Known techniques for producing composites suitable for use in plastic molding, include a sheet molding compound (SMC), a bulk molding compound (BMC), a premix molding compound (PMC) and others. Each of these compounds has associated disadvantages. The SMC, although having relatively good strength and other desirable properties, is difficult to utilize in molds where a thick, complex shape is desired. In the BMC and PMC processes, one step in the process includes subjecting the mixture of filler and reinforcing fiber, to relatively high sheering forces and thus the reinforcement fibers are physically damaged. This limits the physical strength of the resulting compound.

An apparatus is disclosed in U.S. Pat. No. 3,932,980, in which a mixture of viscous material with solid material is continuously made. A pair of spaced mixing rolls drag the viscous filler material and the solid reinforcing material into a gap between the mixing rolls to permit the material to be mixed together. This avoids physically damaging the reinforcement fibers and in some respects represents an improvement over the above-mentioned known techniques.

SUMMARY OF THE INVENTION

It is an object of the present invention to improve upon the apparatus of the type described in U.S. Pat. No. 3,932,980, by providing greater control of the process parameters, thereby affording greater flexibility in the range of impregnated compounds that may be produced.

It is a further object of the present invention to improve the post-processing of the produced impregnated composite materials, so that such compounds may be packaged efficiently in a form that is convenient for supplying the compound to, for example, users of injection molding equipment.

In accordance with the present invention two counter-rotating calender rolls are supplied continuously with a viscous resin coating. The coating thickness is adjustable, as with a coating blade. Cut solids segments, such as textile glass, drop from two cutting tools uniformly onto the two coated calender rolls, respectively. The fiber segments are impregnated evenly with the resin as they pass through a narrow gap between the rolls. Two traversing stripper devices strip the impregnated compound from the calender rolls. The finished impregnate compound can either be collected directly in the receptacles, such as barrels, or guided into a compacting unit for apportioning and bagging.

Each calender roll has a dedicated hopper for supplying the resin coating. Each hopper includes a discharge opening aligned substantially vertically above the axis of a respective calender roll, and wall structure for receiving and confining a supply of resin as a relatively thick paste on the calender roll surface behind the discharge opening. A doctor coating blade projecting obliquely forward of the opening extrudes and spreads the resin paste as a relatively thin layer on the calender roll surface in front of the opening.

The present invention results in an improved uniformity of impregnated compound distribution, relative to the conventional (SMC) systems. The resin layer on each calender roll receives a more uniform and controlled deposit of fiber segments from the cut rovings, because each calender roll has associated with it a dedicated, adjustable cutter. Furthermore, the hopper arrangement according to the present invention, with the resin paste supply located on the calender roll and extruded through the coating blade, permits processing of resin paste of a considerably higher viscocity than can be processed with an SMC type system.

The compacting unit preferably includes a hydraulic pump and motor, compressor cylinder, compacting piston, cover slide valve, cutting equipment and a shut off valve. After being stripped from the calender rolls, the continuously impregnated compound is compressed by the compacting piston. With each ejection stroke, the shut off valve opens, the piston moves to its end position, and the cutter separates the compound in preset quantities, ranging from, for example, 5 to 30 kg.

Preferably, a turntable is positioned below the cutting equipment and has four positions for bagging the compound. After the compacted compound has been apportioned and bagged, the table rotates automatically 90° to its next position. During each brief halt, the filled plastic bags can be removed and empty ones inserted.

Alternatively, a funnel and conveyor may be used to collect the impregnated compound and direct the collected compound to a container or receptacle. The conveyor belt can be adapted to the particular type of receptacle that is to be used in the injection molding production process. The conveyor belt should have a minimum of three positions, a take up position for empty receptacle, a filling position, and a take off position for the full receptacle. After the preset quantity of compound has been filled into each bag or other receptacle, the next one automatically moves into its proper position.

BRIEF DESCRIPTION OF THE DRAWINGS

These and other objects and advantages of the invention will be described below with reference to the accompanying drawings, in which.

DESCRIPTION OF THE PREFERRED EMBODIMENT

Figure 1:
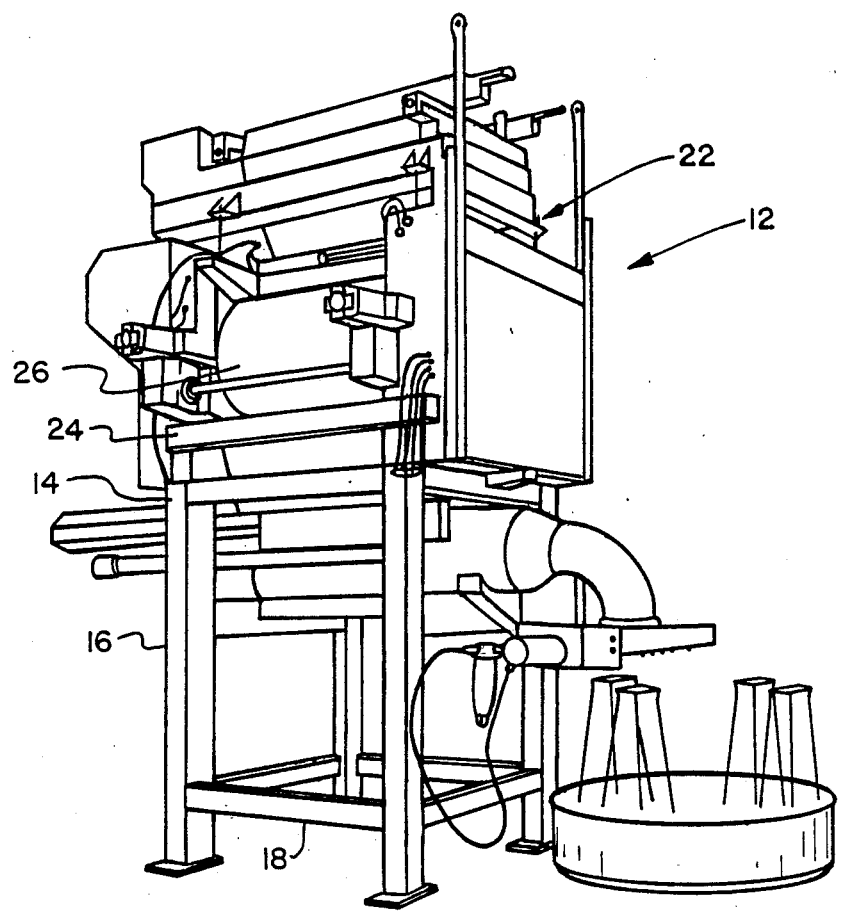
FIG. 1 is a perspective view of the continuous impregnation compound apparatus of the present invention in accordance with a first embodiment of the post-processing equipment.

FIG. 1 shows an apparatus 12 for continuously impregnating compounds in accordance with present invention. The apparatus includes a pedestal 14 having four vertical legs 16 and suitable bracing 18. Atop the pedestal, the mixing unit 22 is operably mounted within a frame 24.

Figure 2:
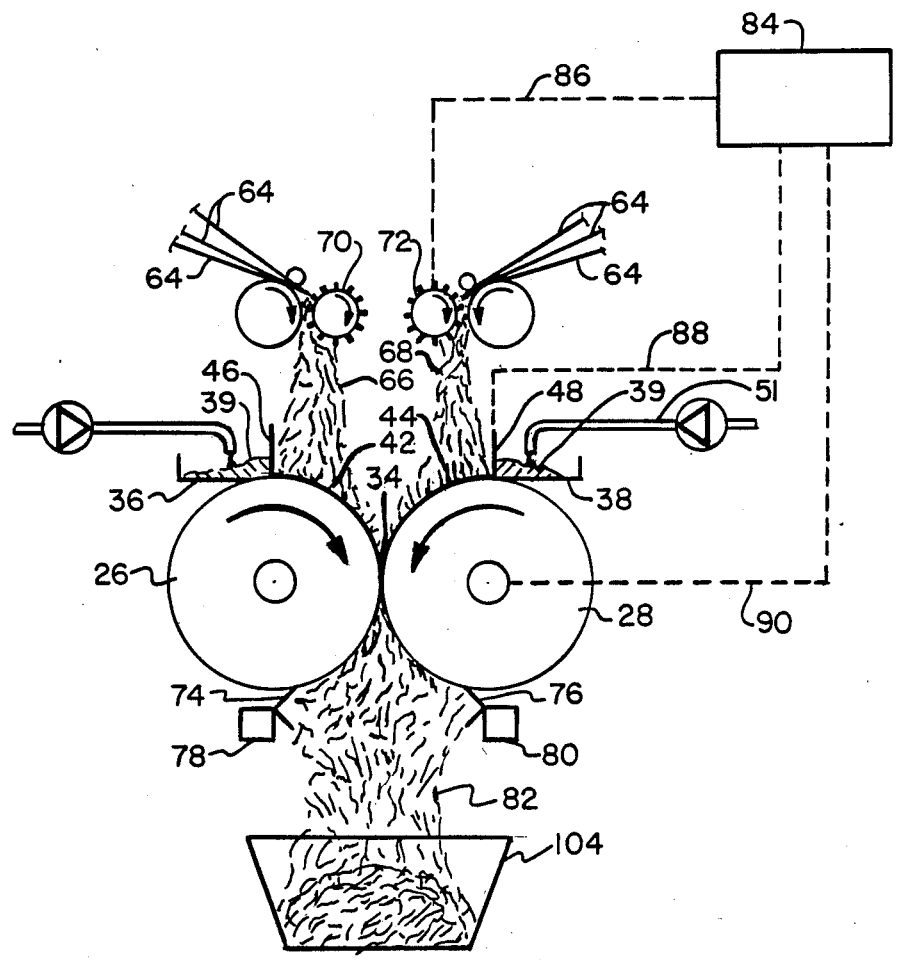
FIG. 2 is a schematic illustration of the manner in which the viscous resin material and the solid reinforcement fibers are combined on the rolls and compressed in the gap between the rolls in accordance with the invention.
Figure 4:
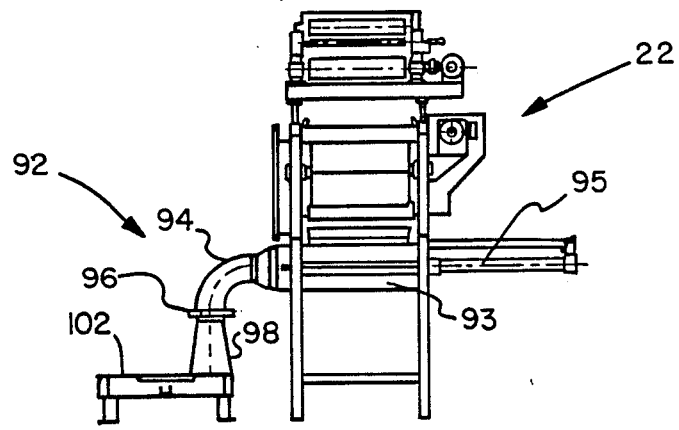
FIG. 4 is a scematic side view of the apparatus shown in FIG. 1.
Figure 5:
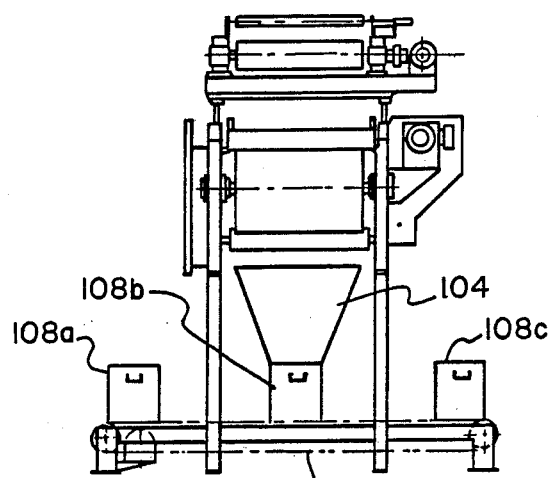
FIG. 5 is a view similar to FIG. 4, showing an alternative embodiment of the post processing feature of the invention.

As also shown in FIGS. 2, 4 and 5 a pair of counter rotating rolls 26, 28 are mounted adjacent each other in the frame 24, at least one of the rolls being attached to a positioning member 32 by which the gap 34 between the center lines of the rollers can be adjusted.

Reservoirs or hopper assemblies 36, 38 for supplying resinous filler material 39 are positioned over the rolls 26, 28 to continuously coat the viscous material as layers 42, 44 on the rolls, respectively. The reservoirs have associated therewith, means, preferably in the form of blades 46, 48, for adjusting the thickness of the layer of viscous material that is applied to the rotatable members. The deposited viscous layers are carried by the rolls into a common mixing gap 34 between the rolls as the rolls are rotated in opposite directions relative to each other.

Figure 3:
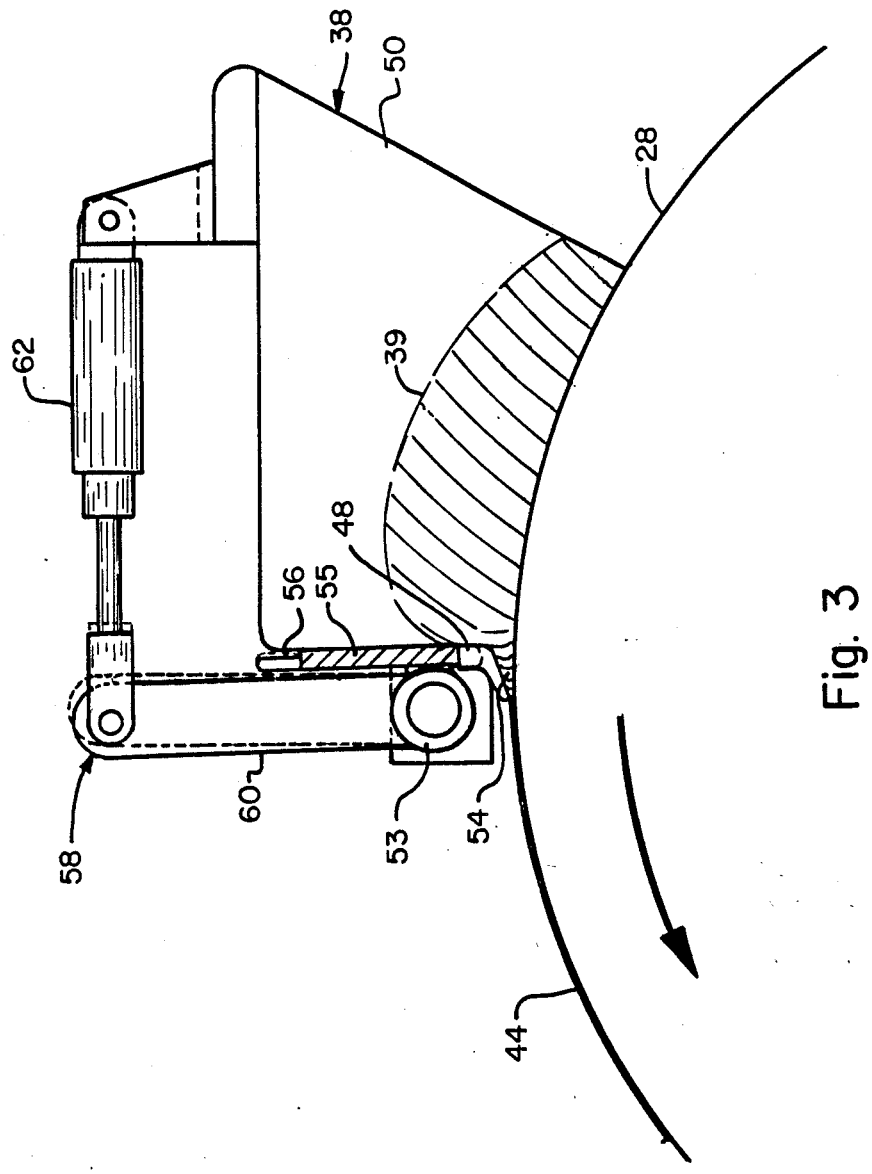
FIG. 3 is an enlarged view of the details of the hopper assembly associated with one of the rolls shown in FIG. 2.

FIG. 3 shows the hopper assembly associated with one of the calender rolls 28. It should be appreciated that the calender roll has an axis of rotation extending into the sheet of drawing, and that the roll thus has an axial, or longitudinal dimension. The hopper assembly 38 has three main components, at least two of which extend substantially coextensively with the axial dimension of the roller. The first component is the hopper wall structure 50 for receiving a subtantially continuous supply of resinous material through line 51 from the mixing unit (see FIG. 2) and confining an elongated globule 39 of the paste-like resinous material on the calender roll surface behind the discharge opening 54 in the wall structure. The discharge opening 54 is preferably located substantially vertically above the axis of the roll, and extends along substantially the full axial extent of the roll, whereby a uniform thickness of resinous paste is formed on the calender roll surface forward of the opening.

The second major component of the hopper assembly 38 is a specially adapted coating blade 48 which projects obliquely forward of the opening, for extruding and spreading the paste as a relatively thin layer 44 on the calender roll surface in front of the opening, as compared with the thicker, non-uniform globule 39 behind the opening. The coating blade 48 can be rigidly connected to the front 56 of the wall structure 50 and, when viewed in section in the direction of the roll axis, the shape of the coating blade resembles a shoe.

The third major component of the hopper assembly is the adjustable support structure 58 by which the front wall structure 56 is maintained in the desired relationship relative to the roll surface, and by which the size of the opening 54 can be adjusted to vary the thickness of the resinous layer 44 in front of the opening. Preferably, the support structure includes a stationary post 60 secured to the frame 24 or the like (not shown) and an arm structure 62 of adjustable length, which is pivotally connected to the wall structure. In one optional embodiment, by adjusting the length of the arm 62, the wall structure 38 may be pivoted relative to the axis of the roll, thereby increasing or decreasing the size of the opening 54 between the wall structure and the roll surface. In this embodiment wherein the coating blade 48 is rigidly connected to the front wall structure 56, the tilting of the wall structure by the support structure, also tilts the blade 48 commensurately. Thus, the orientation of the blade 48 relative to the wall structure remains fixed throughout the range of adjustment of the opening 54. In another embodiment, the blade 48 can be mounted for vertical movement relative to the wall structure 56 for adjustment of the opening 54. For example, a gear 53 mounted on post 60 can drive a vertical worm gear 55 which is rigidly connected to blade 48 and vertically displaceable relative to the front wall 56.

The rotation of the calender rolls cause the resin paste 39 to be pressed or extruded through the hopper opening 54. The orientation and shape of the coating blade 48 makes it possible to process resin paste of a very high viscocity, considerably higher than the capabilities of a conventional SMC set up. The coating blade opening 54 is preferably adjustable within a range of 0.2–1.0 mm.

An additional feature of the present invention is directed to the manner in which the single fiber filaments 64, or rovings, are cut into segments and deposited onto the resin layers 42, 44 carried on the calender rolls. As shown in FIG. 2, in accordance with the invention two distinct streams 66, 68 of cut fiber segments are generated, one stream 66 being deposited on the resinous layer 42 of the first calender roll 2 and the other stream 68 being deposited on the resinous layer 44 of the second calender roll 28, immediately after the resinous layers emerge from the respective discharge openings 54. Preferably, the rovings 64 are cut by two separate, rotory cutting tool sets or devices, the first cutting tool 70 positioned above the first calender roll 26 and the second cutting tool 72 positioned above the second calender roll 28. The single fiber elements 64 are transported equidistantly to both cutting devices, which extend in the axial direction of the rolls, substantially to the same extent as the hoppers 36, 38.

Depending on the choice of cutter equipment 70, 72, slit lengths of, for example, 13 mm, 25 mm, or 50 mm are possible. With the arrangement of the present invention, exact and uniform distribution of the fiber segments is provided on the resin layers 42, 44. The fiber segments fall in a uniform rainfall on the rotating calender rolls and stick to the resin layer in the exact position and distribution desired, before the layers and associated fibers are pressed in the gap 34.

By the opposite direction of rotation of the calender rolls, the resin layer with embedded fiber segments is transferred into the gap 34 and is impregnated between the rolls. The fiber segments are thus soaked in the resin paste, and are then deemed a "fiber compound".

After impregnation, the compound is removed from the rolls 26, 28 with the aid of a set of doctor knives 74, 76 brushing over the lower surfaces of the rolls. The knife blades are rigidly supported parallel to a roll axis, by fixtures 78, 80. The detached impregnated compound 82 can, in the basic embodiment of the present invention, be further processed in injection presses or as SMC in a press molding process.

With the machine 22 as described, a wide variability of the control parameters is possible, thereby affecting simultaneously the production output, the impregnation quality of the glass, and thus the quality of the molded material. For example, the roll speed may be varied in a range of 6 m/min.–60 m/min., and the speed of the cutting rolls may be varied in the range of 12 m/min.–75 m/min. The roll nip is directly proportional to the glass fiber content and the height of the opening of the coating knife.

The adjustments can be made manually, but FIG. 2 shows this adjustment capability schematically as implemented through a control box 84. Control signals 86, 88, and 90 respectively adjust the cutting roll speed, discharge opening, and the mixing roll gap and speed.

With a roll width of 75 cm and the standard adjustment, two tons of compound per hour can be produced without encountering problems. The glass reinforcing fiber is not damaged. This is because the impregnation of the glass takes place by calandering and not in a mechanical mixing process.

An important process parameter in this production of glass fiber reinforced compounds is the viscosity of the impregnating paste. The present invention affords the advantage that impregnating pastes of very different viscosities can be utilized, and thus recipes typically used for SMC and BMC are workable with the present invention. Due to the high roll speeds which cause a strong shear gradient at the coating blades 46, 48 and, especially if the rolls 26, 28, are heated, the specific viscosity of the impregnating paste globule 39 is decreased before the actual pressing together in the gap 34 between the rolls.

The relatively low grade of mechanical properties resulting from the BMC process is attributed to damage of the glass fibers and to their irregular distribution. By contrast, the integrity of the glass fibers in accordance with the present invention is retained during the production phase of the compound, whereby better mechanical properties, particularly a higher impact strength, are attained. In a comparison of the BMC and the present invention, both on the basis of a low-profile system with 20% glass fiber, the present invention resulted in an increase in the Charpy impact strength of 40% for the press molded parts and 20% for the injection molded parts. With the present invention the surface quality is also fully retained. With the use of the same recipes, the parts produced in accordance with the present invention display a comparable quality if not better surface relative to the parts produced from BMC compounds.

By adjustment of the processing parameters the compound may be produced both detached, as in the BMC process and in matte as in the SMC process. The compound produced with the present invention in the preform may be used without change instead of either SMC or BMC.

COMPARISON OF THE PRESENT INVENTION (CIC) WITH BMC WITH THE SAME IMPREGNATING PASTES

|  | Press molding Process | | Injection molding Process | |
| --- | --- | --- | --- | --- |
|  | CIC | BMC | CIC | BMC |
| Modulus in MPA | 10280 | 13280 | 10130 | 11460 |
| Bending stress in MPA | 125 | 97 | 82 | 89 |
| Elongation | 2.40 | 1.13 | 1.30 | 1.04 |
| Charpy impact strength J/cm$^3$ | 1.01 | 0.66 | 0.62 | 0.52 |

This was a low profile recipe, 200 batch parts and 20% glass fiber.

With the present invention, glass fiber content in excess of 30% may be achieved, and higher viscosity impregnating pastes may be used.

FIG. 4 shows a compacting unit 92 operably associated with the continuous impregnating compound production apparatus 22 described above. The impregnated compounds for use in injection molding machines should be largely free of air inclusions. With the apparatus in FIG. 4, the compound stripped from the rolls is collected in a cylinder 93 which is mounted in the pedestal 14 below the stripping knives 74, 76 (FIG. 2). A slidable cover valve (not shown) at the top of the cylinder is controlled in conjunction with the feed supply of the reinforcing fibers and the viscous paste, to seal off the cylinder 93 when sufficient compound 82 has been collected to initiate compression thereof. A piston and rod 95 within the cylinder 93, then compresses the compound and, upon the application of sufficient pressure, the compacted compound is urged as a block into a holding conduit 94. With each ejection stroke of the piston the shut off valve opens, the piston moves to its end position, and the cutter 96 separates a predetermined quantity of compressed compound so that it falls into, for example, a bag 98 positioned under the cutter. A typical cut off section of compound ranges from about 5 to about 30 kg.

Preferably, the receptacle or container 98 is mounted on a turntable 102 which has four positions. After the compacted compound had been apportioned and bagged, the table rotates automatically 90° to its next position. During each indexed position the filled plastic bags 98 or the like can be removed and empty ones inserted.

Figure 6:
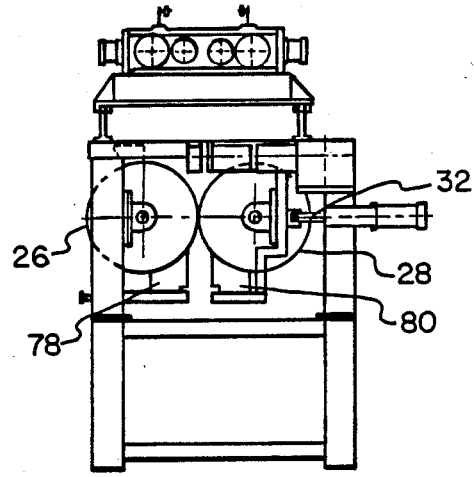
FIG. 6 is a front view of the main portion of the apparatus shown in FIG. 5, with the conveyor portion deleted.

An alternative arrangement is shown in FIG. 6, where a funnel 104 serves to collect the impregnated compound scraped from the rolls. A conveyor belt 106 serially directs a plurality of receptacles 108a—108c into positions below the funnel 104 to receive and be filled with the compound passing through the funnel. The conveyor belt has at least three positions, one of which receives the empty receptacle 108a, the filling position 108b, and then the take off position for the filled receptacles 108c.

We claim:

1. An apparatus for continuously making a mixture of viscous material with segments of solid material, comprising:

first and second rotatable members supported in position for rotation in the opposite directions with respect to each other and spaced from each other to define a mixing gap therebetween;

means associated with at least one of said rotatable members, for adjusting said mixing gap;

first supply means for continuously coating the viscous material as a layer on said first and second rotatable members, said viscous layers on said first and second rotatable members adjoining each other and subsequently entering said mixing gap as said first and second rotatable members are rotated in the opposite direction to each other;

means for adjusting the thickness of the layer of viscous material applied to the rotatable members;

second supply means for supplying the segments of solid material onto said viscous layer, said solid material after having been supplied onto said viscous layers being dragged into said mixing gap during rotation of said first and second rotatable members to mix with said viscous material as it passes through said mixing gap, thereby forming an impregnated compound;

means for stripping the impregnated compound from the rotatable members;

means for collecting the impregnated compound stripped from the rotatable member;

means for compressing the collected impregnated compound into a block;

means for receiving a block of impregnated compound from the means for compressing and for cutting a predetermined quantity from the block; and means for directing the cut quantities into a receptacle.

2. The apparatus of claim 1 wherein the first supply means includes a hopper with a discharge opening located above each rotatable member and a blade associated with each opening for applying said layer.

3. A method for producing polyester compounds reinforced with solid fibers, comprising the steps of:

operating a pair of rotatable members in counter rotation spaced apart in side by side relation to form a gap therebetween;

heating the rotatable members;

continuously coating a layer of viscous resin material on the rotatable members such that the layers are rotated into the gap, the coating being applied under shear stresses whereby the absolute viscosity of the resin material is reduced;

continuously depositing fibrous solids on the viscous layer, such that the layer and solids are dragged into the gap and intermixed to form an impregnated compound; and scraping the compound from the rotatable members.

4. The method of claim 3, further including the step of adjusting the thickness of the layer of viscous material.

5. An apparatus for continuously making a mixture of viscous material with solid material segments cut from rovings comprising:

first and second rotatable members supported in position for rotation in the opposite directions with respect to each other and spaced from each other to define a mixing gap therebetween;

first supply means including first and second blade members adjustably spaced from the rotatable members for continuously coating the viscous material as a layer of controllable thickness on said first and second rotatable members, respectively, said viscous layers on said first and second rotatable members adjoining each other and subsequently entering said mixing gap as said first and second rotatable members are rotated in the opposite direction to each other;

second supply means for supplying the solid material onto said viscous layers, said second supply means including means for cutting the rovings into cut segments which are deposited on the viscous layers of the first and second rotatable members;

said cut segments after having been supplied onto said viscous layers being dragged into said mixing gap during rotation of said first and second rotatable members to mix with said viscous material as it passes through said mixing gap, thereby forming an impregnated compound; and means for stripping the impregnated compound from the rotatable members.

6. The apparatus of claim 5 wherein the means for cutting includes first and second rotary cutting tools, the first cutting tool being positioned above the first rotatable member and the second cutting tool being positioned above the second rotatable member.

7. An apparatus for continuously making a mixture of viscous material with solid material segments cut from rovings comprising:

first and second rotatable members supported in position for rotation in the opposite directions with respect to each other and spaced from each other to define a mixing gap therebetween;

first supply means for continuously coating the viscous material as a layer on said first and second rotatable members, said first supply means including a hopper assembly for each of said rotatable members, each hopper assembly including a discharge opening aligned substantially vertically above the axis of a rotatable member, wall means for receiving and confining a supply of viscous material as a relatively thick globule on the surface of the rotatable member behind the discharge opening, and a coating blade projecting obliquely forward of the opening, for extruding and spreading the viscous material as a relatively thin layer on the surface of the rotatable member in front of the opening;

said viscous layers on said first and second rotatable members adjoining each other and subsequently entering said mixing gap as said first and second rotatable members are rotated in the opposite direction to each other;

second supply means for supplying the solid material segments onto said viscous layer, said solid material after having been supplied onto said viscous layers being dragged into said mixing gap during rotation of said first and second rotatable members to mix with said viscous material as it passes through said mixing gap, thereby forming an impregnated compound; and means for stripping the impregnated compound from the rotatable members.

8. The apparatus of claim 7 wherein the coating blade has a cross sectional shape that resembles a shoe when viewed in the direction of the axis of the rotatable member.

9. The apparatus of claim 7 wherein the coating blade is rigidly mounted on the wall means.

10. The apparatus of claim 7 wherein the hopper assembly further includes means for lifting the coating blade relative to the surface of the rotatable member, thereby adjusting the size of said discharge opening.

11. The apparatus of claim 10 wherein the orientation of the coating blade relative to the wall means remains fixed during the operation of said means for lifting.

12. The apparatus of claim 7, wherein said second supply means includes means for cutting the rovings into two distinct streams of segments, the first stream being deposited on the first rotatable member and the other stream being deposited on the second rotatable member, immediately after the viscous material emerges as a layer from each of the respective coating blades.

13. The apparatus of claim 12 wherein the means for cutting includes first and second rotary cutting tools, the first cutting tool positioned above the first rotatable member and the second cutting tool positioned above the second rotatable member.

14. The apparatus of claim 12 further including means for adjusting the coating blades relative to the rotatable members to vary the thickness of the layer of viscous material applied to the rotatable members.

15. The apparatus of claim 14 further including means associated with at least one of said rotatable members, for adjusting said mixing gap.

16. The apparatus of claim 5, wherein the means for cutting cuts the rovings into two distinct streams, one stream being deposited on the viscous layer of the first rotatable member and the other stream being deposited on the viscous layer of the second rotatable member.

* * * * *